US006018687A

United States Patent [19]

Tabor

[11] Patent Number: 6,018,687

[45] Date of Patent: Jan. 25, 2000

[54] METHOD AND APPARATUS FOR PRINTING CUTOFF CONTROL USING PREPRESS DATA

[75] Inventor: Keith A. Tabor, Richfield, Wis.

[73] Assignee: Quad/Tech, Inc., Sussex, Wis.

[21] Appl. No.: 08/797,316

[22] Filed: Feb. 7, 1997

[51] Int. Cl.[7] .......... G06F 19/00

[52] U.S. Cl. .......... 700/125; 700/122; 700/124; 83/72; 83/73

[58] Field of Search .......... 382/8, 34, 42; 83/72, 73, 74, 76; 700/122, 124, 125

[56] References Cited

U.S. PATENT DOCUMENTS

| | | | |
|---|---|---|---|
| 3,915,090 | 10/1975 | Horst et al. | 101/426 |
| 4,243,925 | 1/1981 | Gnuechtel | 318/603 |
| 4,366,753 | 1/1983 | Glanz et al. | 101/181 |
| 4,482,971 | 11/1984 | Blazek | 364/552 |
| 4,495,582 | 1/1985 | Dessert et al. | 364/469 |
| 4,719,575 | 1/1988 | Gnuechtel | 364/469 |
| 4,736,446 | 4/1988 | Reynolds et al. | 382/8 |
| 4,736,680 | 4/1988 | Wales et al. | 101/426 |
| 4,849,914 | 7/1989 | Medioni et al. | 364/526 |
| 4,882,764 | 11/1989 | Reynolds et al. | 382/8 |
| 4,885,785 | 12/1989 | Reynolds et al. | 382/8 |
| 4,887,530 | 12/1989 | Sainio | 101/181 |
| 4,991,761 | 2/1991 | Focke | 226/15 |
| 5,043,904 | 8/1991 | Sikes | 364/469 |
| 5,074,450 | 12/1991 | Lindner et al. | 226/21 |
| 5,076,163 | 12/1991 | Sainio | 101/181 |
| 5,115,141 | 5/1992 | Gold | 250/548 |
| 5,119,981 | 6/1992 | Gnuechtel et al. | 226/15 |
| 5,163,368 | 11/1992 | Pensavecchia et al. | 101/136 |
| 5,175,804 | 12/1992 | Wittman | 395/108 |
| 5,188,033 | 2/1993 | Fadner | 101/467 |
| 5,223,720 | 6/1993 | Weyer | 250/548 |
| 5,313,278 | 5/1994 | Duenyas et al. | 358/527 |
| 5,325,217 | 6/1994 | Nagler et al. | 358/506 |
| 5,333,548 | 8/1994 | Fadner | 101/467 |
| 5,334,870 | 8/1994 | Katada et al. | 257/371 |
| 5,335,292 | 8/1994 | Lovelady et al. | 382/17 |
| 5,335,315 | 8/1994 | Yoshida et al. | 395/109 |
| 5,339,176 | 8/1994 | Smilansky et al. | 358/504 |
| 5,343,234 | 8/1994 | Kuehnie | 346/159 |
| 5,412,577 | 5/1995 | Sainio et al. | 364/469 |
| 5,452,632 | 9/1995 | Dürr et al. | 83/13 |
| 5,568,767 | 10/1996 | Jackson | 101/226 |

*Primary Examiner*—Paul P. Gordon
*Attorney, Agent, or Firm*—Michael Best & Friedrich LLP

[57] ABSTRACT

A cutoff control system for controlling the positional relationship of a series of printed images on a continuous web of material relative to a cutoff device. The system includes a scanner for producing an output signal indicative of a suitable portion of the printed image on said web and a mechanism for laterally positioning the scanner with respect to said printed image on said web. The system also includes a control mechanism for controlling the operation of the positioning mechanism in response to digital prepress data, including a system for determining a suitable portion of the printed image to be scanned by the scanner.

17 Claims, 3 Drawing Sheets

METHOD AND APPARATUS FOR PRINTING CUTOFF CONTROL USING PREPRESS DATA

BACKGROUND OF THE INVENTION

The invention relates to the field of printing control in a web-fed printing system. More particularly, the invention relates to the determination of a suitable position for a scanner in a web longitudinal position measurement system such as in a cutoff control system.

In a web-fed printing system, a series of repeating images are printed on a web of material, typically paper. In a typical process, the web is slit into two or more ribbons. The ribbons are directed to a folder where they are aligned one on top of the other and then folded in a direction parallel to the direction of web travel. A cutting mechanism cuts the web in a direction transverse to the direction of web movement. A cutoff control system typically operates to control the longitudinal position of the web such that the cutting mechanism cuts the web at the appropriate time in order to properly separate the repeating images on the web.

Early systems for cutoff control operate with control marks separate from the desired printed image. These control marks, in conjunction with a scanner, are utilized in order to determine the longitudinal position of the image on the web relative to the cutting mechanism. More recent cutoff control systems, such as those described in U.S. Pat. Nos. 4,736,446 and 4,882,764, are also operable in a pattern recognition mode, which mode does not require the use of control marks separate from the desired printed image.

The cutoff control systems described in the above-mentioned patents operate to periodically adjust the positional relationship of the web and the cutting mechanism by controlling the movement of a compensation roller with the use of appropriate control signals. More specifically, as the web travels in a longitudinal direction, an optical scanner is used to produce an output signal corresponding to the light reflected from the image on the web passing underneath. The scanned portion of the image is digitally correlated with a reference image previously stored in memory in order to generate a control signal indicative of the longitudinal offset between the scanned portion and the reference image. The pertinent portion of the image used in the correlation is a strip of the image extending in the longitudinal direction, or essentially the portion of the image passing within the field of view of the scanner.

The control signal is fed to a compensation motor which controls the position of a compensation roller. The compensation roller and a pair of cooperating idler rollers are interposed in the web path upstream of the cutting mechanism. The compensation motor is responsive to the control signal and selectively adjusts the position of the compensation roller such that the effective length of the web path between the printing units and the cutting mechanism is increased or decreased as necessary. In this manner, cutoff at the appropriate location between repeating images on the web is achieved.

At press start-up, it is desirable that the correct cut-off position be achieved as soon as possible in order to minimize the amount of paper waste produced due to bad product. Some current folders have a preset capability, which automatically sets the position of the angle bars and compensators to appropriate positions based on the settings of previous runs of a similar configuration. In this manner, cutoff is effected at approximately the right place, i.e., within approximately a quarter of an inch or so (rather than having cutoff occur directly in the middle of the desired image). By using the known distance from the required cutoff position to a mark sensed by the cutoff control system scanner, proper cutoff control may be rapidly achieved at startup.

When the cutoff control system is run in pattern recognition mode, however, because the longitudinal distance from the proper cutoff position to the start of the reference pattern is generally unknown, proper cutoff control at startup has typically required cutoff adjustment by a pressmen. This results in waste of paper during the startup operation. Once the proper cutoff is achieved, the cutoff control system is intended to operate so as to maintain that cutoff position.

Another cutoff control system is described in U.S. Pat. No. 4,719,575. This patent discloses a method for analyzing a printed image on a web to automatically locate a suitable control mark which is a portion of the image. That method includes the steps of storing a longitudinal profile of indicia located on the web surface by scanning the image, and identifying within the sampled profile local peaks of light intensity. The local peaks indicate portions of the image which can be used as a suitable control mark. In summary, the method disclosed in U.S. Pat. No. 4,719,575 locates a control mark within an alley extending in the longitudinal web direction which is suitable for the cutoff control system as described therein.

As previously described, the cutoff control system disclosed in U.S. Pat. No. 4,882,764 is capable of operating in a pattern recognition mode as well as being capable of operating with the use of separate control marks. When using separate control marks, the control marks are generally printed in the margin around the desired image, and the optical scanner is positioned such that these control marks are within the field of view of the scanner. In the pattern recognition mode, the lateral position of the optical scanner on the web is initially positioned by a pressman.

SUMMARY OF THE INVENTION

One of the features of the invention is the recognition that, for some images, such as where the scanned portion of the image consists of identical multiple lines equally spaced and extending in the lateral web direction, the correlation performed by the cutoff control system on the scanned and the reference image will produce more than one peak. This can lead to an incorrect but stable cutoff signal causing error in the cutoff location. Because there is more than one cross correlation peak, the reference and the acquired pattern may be improperly aligned by exactly one or more cross correlation peaks, and then consistently produce an erroneous cutoff with high correlation.

The invention also recognizes that another problem with prior art systems may occur because the web may be subject to spurious lateral shifts with respect to the stationary scanner especially at high web speeds. This can result in the scanned portion of the image not corresponding exactly to the reference image previously scanned. In some cases, for example, if the image consists of diagonally oriented lines relative to the web edges, the lateral shifting of the web will result in an incorrect determination of longitudinal offset. This would also result in an incorrect cutoff position. Lateral shift can also result in pattern correlation being lost, with a result of no cutoff information being supplied.

It is an object of the present invention to improve the performance of a cutoff control system by using prepress data or data from scanned prepress images to determine a suitable portion of an image to be used to preset cutoff control and to laterally position the scanner in order to overcome the above-mentioned problems.

An additional object of the present invention is to reduce printing paper waste by using prepress data to determine whether it will be possible to use portions of the printed image as cutoff control reference marks or whether separate control marks (i.e., control marks separate from the desired printed image) will be required for a given printed image for proper operation of the cutoff control system.

Another objective of the invention is to employ the use of prepress data to select, if possible, an area of the web to be scanned, that area including data for controlling cutoff and selected because it is insensitive to any lateral shift of the web during the printing operation and is insensitive to stable cutoff jumps.

Other advantages of the present invention include automatic ink-based presetting for cutoff control which results in a reduction in the amount of paper waste during make ready.

Other features and advantages of the invention will become apparent to those of ordinary skill in the art upon review of the following detailed description, claims, and drawings.

Figure 1:
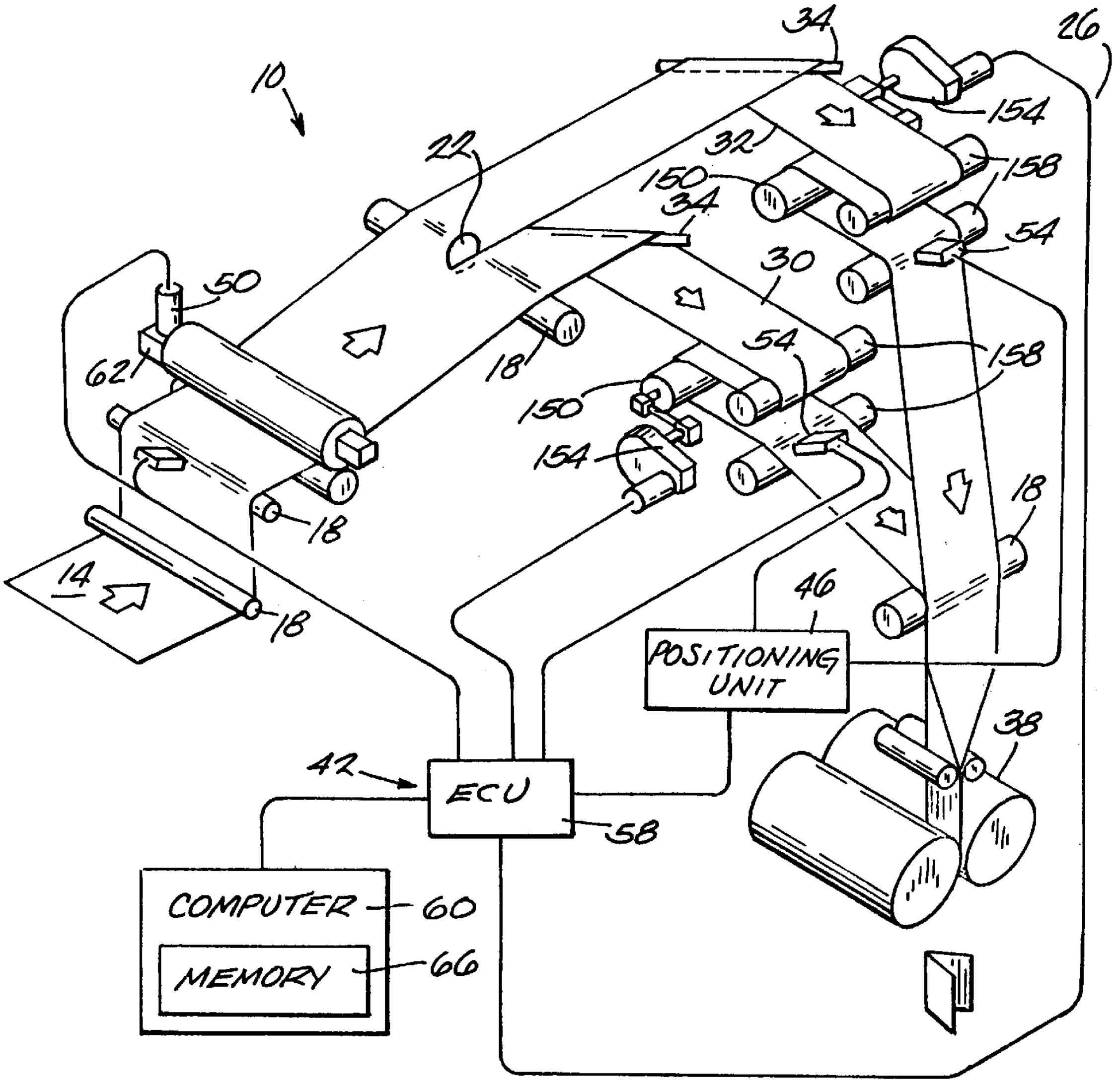
FIG. 1 is a schematic illustration of a press line including a cutoff control system embodying the present invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Illustrated in FIG. 1 is a portion of a typical multicolor web-fed printing press line 10. A web of material 14 (e.g. paper) is sequentially driven through a plurality of printing units (not shown) wherein each printing unit applies a different color ink to the web 14 to produce a multicolor printed image. The desired image is repeatedly printed on the web 14 as the web 14 travels in a longitudinal direction past the printing units.

The web 14 is next routed by idler rollers 18 and to other web processing units such as a slitter 22 and a folder 26. As the web 14 travels in a longitudinal direction, the slitter 22 operates to slit the web 14 in a direction substantially parallel to the direction of web movement into two ribbons 30, 32. The folder 26 includes angle bars 34 which operate to align ribbons 30, 32 one on top of the other. The folder 26 also operates to longitudinally fold the ribbons 30, 32. The folder 26 also includes a cutting mechanism 38 which operates to cut the folded ribbons in a direction transverse to the direction of web movement at the appropriate time in order to properly separate the repeating images on the web 14 with respect to the position of ink on the web.

In the preferred embodiment, the cutoff control system 42 includes a positioning unit 46, encoder 50, a scanner 54, and an electronic control unit (ECU) 58. Encoder 50, scanner 54, and ECU 58 are available from Quad/Tech of Sussex, Wis., as their PPC 3000 unit, and are arranged to interface with the positioning unit 46 and a computer 60. The PPC 3000 unit is a print-to-cut or print-to-process register system. The positioning unit 46 is responsive to a signal from the ECU 58 and operates to control the lateral position of the scanner 54 with respect to ribbons 30, 32, as further described below.

The scanner 54 is a contrast scanner such as a photodiode-type scanner used to sense light reflected from the printed image as the printed image passes underneath the scanner. In the preferred embodiment, the scanner 54 outputs an analog signal with the value of that signal dependent on the light reflected from the image. In an alternate embodiment, the scanner outputs a digital signal with the value of that signal depending on whether the image at the measured point reflects enough light to exceed the threshold of the scanner's comparator. The threshold of the comparator of the digital scanner may be selectively adjusted by the PPC 3000 unit. In either the digital or analog case, as the ribbons 30, 32 travel in a longitudinal direction, the scanner 54 outputs a signal corresponding to the light reflected from the image within the scanner's field of view.

The encoder 50 is mounted directly to the press drive shaft 62 and sends mechanical positional information to the ECU 58. Typically, the encoder 50 is geared so that one shaft revolution of the encoder equals one revolution of the printing unit cylinders.

The ECU 58 also communicates with a computer 60. Computer 60 includes a memory 66 for storing digital prepress data. The digital prepress data is preferably in a format representative of the colors and the location of the colors making up the desired image to be printed. This data is typically available in array format. For example, direct-to-plate systems are currently available which utilize the digital prepress data to directly produce the printing plates used to print the desired image. For a typical four color ink printing process, four separate arrays representative of the four ink colors (black, cyan, magenta, and yellow) are available from the direct-to-plate system and contain information regarding ink location for the desired image. It is also contemplated that in an alternate embodiment of the invention the digital prepress data to be included in the computer memory 66 could be obtained by scanning either a printing plate or a proof of the desired image. Scanner format data could also be obtained directly by scanning a proof directly with scanner 54.

Preferably, the digital prepress data arrays contain data oriented within the array such that data in the columns represent slices of the desired image extending in the longitudinal direction (defined with respect to how the image will be oriented on the web, where the longitudinal direction is defined as the direction of web motion). Additionally, the rows of the digital prepress data arrays contain data representative of slices of the image extending in the lateral direction (where the lateral direction is defined as substantially perpendicular to the longitudinal direction).

Figure 2A:
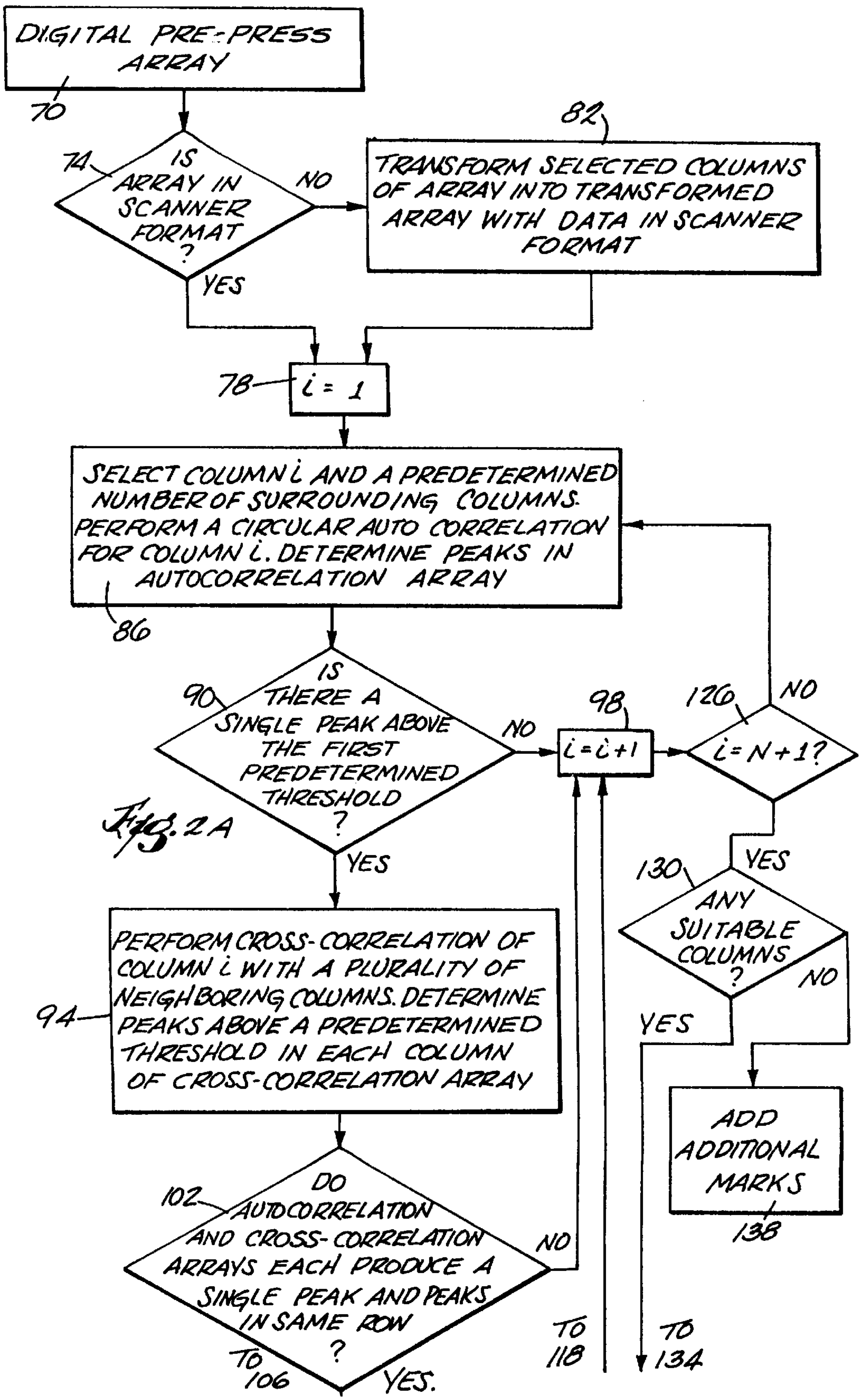
FIGS. 2A and 2B together comprise a flowchart illustrating a method in accordance with the invention and carried out by the apparatus of FIG. 1.
Figure 2B:
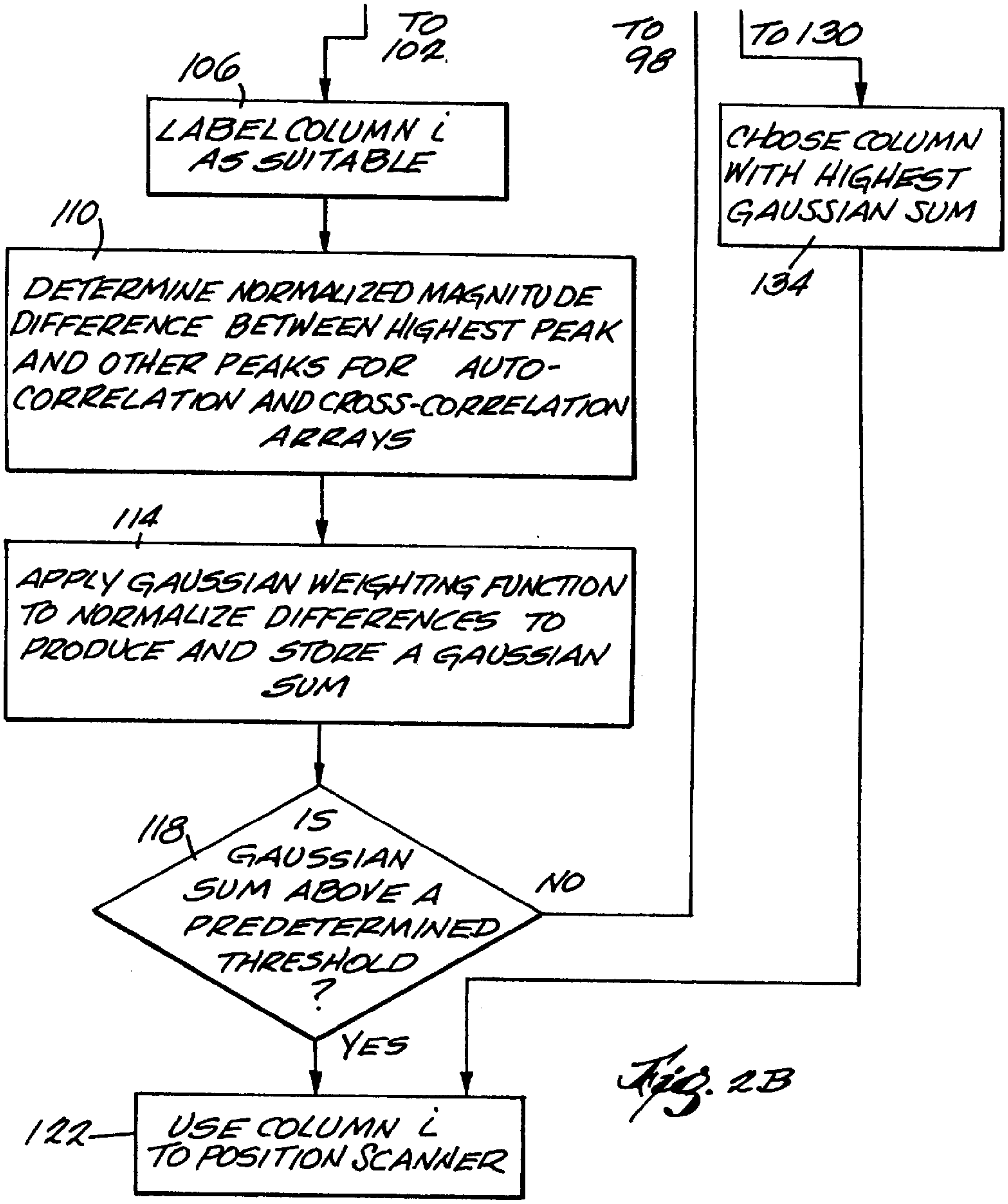

Computer 60 is programmed to carry out the steps shown in the flow charts of FIGS. 2A and 2B. FIGS. 2A and 2B illustrate a series of steps for determining whether or not an suitable portion of an image exists to be used for cutoff control. In the preferred embodiment, a suitable portion, if it does exist, is a strip of the image extending in the longitudinal direction. The suitable portion of the image corresponds to where the scanner 54 of the cutoff control system 42 is laterally positioned, preferably by positioning unit 46, in order to effect proper operation of the cutoff control system 42 (i.e., unambiguous cutoff which is relatively insensitive to spurious lateral shifts). If a suitable portion of an image is not found, additional control marks should be added to the desired image to reduce printing paper waste.

The digital prepress data array 70, whether obtained from a direct-to-plate system or obtained by scanning a printing plate or scanning a proof, is tested in step 74 to determine whether the data is in the same format as the output produced by scanner 54. If the data is in the same format, processing proceeds to step 78. If the data is not in the same format, processing proceeds to step 82.

In step 82 the data is transformed to an arrangement compatible with the output signal from the scanner 54. It is also contemplated that in order to lessen the amount of processing required, only selected columns of the prepress data array would need to be transformed, instead of transforming the whole array. For example, depending on the processing capabilities of the computer 60 as well as resolution requirements, every other column of the prepress array could be transformed and then in only a selected range of columns.

Essentially, the digital pre-press data array 70 (or portions thereof) is transformed using image processing techniques to a form which would result if the scanner 54 of the cutoff control system 42 were scanned over the corresponding actual image. Preferably, this means that a column of data in the transformed array corresponds to data which would be obtained by the scanner 54 when it scans the corresponding physical column position. Non-print areas of the web would have corresponding data values representative of white paper. In general, to perform step 82 a model of the scanner 54 is required, including its color illumination spectrum, color sensitivity and spatial transfer characteristics. Additionally, ink color transfer characteristics must also be known. Processing then proceeds to step 78.

In step 78, the column number i is initialized to one and processing proceeds to step 86.

In step 86, column i and a preselected number of neighboring columns of column i are selected from the transformed array. Column i is processed using circular autocorrelation. This means that column i is autocorrelated with itself and the results are stored as an autocorrelation array. The peaks in the autocorrelation array above a first predetermined threshold are determined. The first predetermined threshold is set as a percentage of the difference between minimum and maximum values in the autocorrelation array. Processing then proceeds to step 90.

In step 90, a determination is made whether the autocorrelation array produced for column i contains a single peak above the first predetermined threshold. If so, processing proceeds to step 94. If not, processing proceeds to step 98.

In step 94, column i in the transformed array is processed by cross-correlation with each of its neighboring columns. The results are stored as a cross-correlation array. More specifically, column i is separately cross-correlated with each predetermined neighboring column to produce a column of the cross-correlation array. The number of neighboring columns to be processed with column i to produce the cross-correlation array would be greater when greater lateral web weave was expected during printing.

Next, all peaks above the first predetermined threshold in each column of the cross-correlation array are determined, and processing proceeds to step 102.

In step 102, a determination is made whether column i is a suitable lateral location. Column i is a suitable lateral location if that column has a single correlation peak above the first predetermined threshold in the autocorrelation array and a single correlation peak above the first predetermined threshold in each column of its corresponding cross-correlation array. Additionally, a suitable lateral location requires that all such peaks occur at the same row position in the autocorrelation and cross-correlation arrays. A suitable lateral location would correspond to a lateral position that is somewhat insensitive to lateral web movement. The result of this would be the PPC would report good correlation and correct cutoff. If column i is determined to be a suitable location, processing proceeds to step 106. If this is not the case, processing proceeds to step 98.

In step 106, column i is stored as a suitable lateral location, and processing proceeds to step 110.

In step 110, a comparison is made between the highest peak and the other peaks in both the autocorrelation array and the cross-correlation arrays. This step involves computing the magnitude difference between the highest peak and the next lower peak in each column (the highest peak being that single peak above the first predetermined threshold). The magnitude difference is normalized. A normalized magnitude difference is computed for column i's corresponding autocorrelation array and for each column in its cross-correlation array. The results are stored in a difference array. The larger the magnitude difference between peaks, the less likely it is that the scanner will lock on an incorrect peak during cutoff control. The results of step 110 could be used to eliminate columns from consideration if the highest peak is not sufficiently greater in magnitude than an adjacent peak. Processing then proceeds to step 114.

In step 114, a weighting function is applied to the difference array. For example, a Gaussian weighting function, centered at the data representative of column i (from the autocorrelation array) is applied in a spatial manner to the corresponding values in the difference array. In this manner, columns that are physically closer to the column i receive a higher weighting than those columns which are more distant. After multiplication of corresponding values, the products are summed to produce a Gaussian sum, and processing proceeds to step 118.

In step 118, a determination is made whether the calculated Gaussian sum is above a predetermined threshold. If so, processing proceeds to step 122. If not, processing proceeds to step 98. In step 122, column i is used to position scanner 54.

In step 98, the column number i is incremented by at least one, and processing proceeds to step 126. In step 126, a determination is made whether or not all relevant columns N in the transformed array have been processed. If so, processing proceeds to step 130. If not, processing proceeds to step 86.

In step 130, a determination is made if any columns have been determined to be suitable lateral locations. If yes, processing proceeds to step 134. If no, this indicates that the desired image does not contain an appropriate slice extending in the longitudinal direction corresponding to where the scanner should be positioned in order to effect proper operation of the cutoff control system, and processing proceeds to step 138. In step 138, additional control marks are added to the desired image.

Optionally, if more than one column is determined to be a suitable lateral location, these columns may be further processed in step 134 to determine which of the suitable columns is best by selecting the column with the highest Gaussian sum to be used to position the scanner.

If marks are added, as in step 138, steps 70–138 can be re-executed in the neighborhood of the added marks to insure that the marks will function sufficiently in the cutoff control system with the desired image. Reprocessing a portion less than the entire image may be sufficient.

Once a suitable location is selected, this information is communicated from computer 60 to ECU 58. A control signal from ECU 58 is communicated to positioning unit 46 to thereby position the scanner 54 at the lateral position corresponding to the selected suitable location.

It should be understood that PPC 42 needs to receive the reference pattern information in scanner format from the computer 60 corresponding to the selected spot. PPC 42 must also receive from the computer 60 the physical location of the reference pattern, as well as the cutoff position in the reference pattern.

Referring back to FIG. 1, once scanner 54 is appropriately positioned, the cutoff control system 42 operates to provide automatic closed-loop control of web compensators 150 and other correction devices to maintain the position of the printed image on the web 14 in relation to the cut produced by cutting mechanism 38.

At startup, the press control system may operate to preset or position the web compensators 150 to achieve the approximately correct longitudinal cut position without the need for human intervention. Appropriate presetting reduces the amount of time and paper required to initially position to the correct paper cut position and significantly reduces the amount of paper waste that otherwise occurs during the startup of the printing operation. Ink-based presetting is accomplished by using the digital pre-press information to determine the longitudinal position of the cut with respect to the image printed and using that information to position the web compensators 150. The longitudinal position of the cut with respect to this image (based on the pre-press data array) is passed from computer 60 to ECU 58. The encoder 50 is synchronized to the printing units, and the cutoff phase difference between the scanner and the cutting mechanism is known from other jobs. Using the above information, the position of the compensator 150 is varied in order to achieve the desired phase difference between the scanner and the cutting mechanism in order to appropriately achieve a correct cutoff position as soon as sufficient ink is present.

More specifically, the scanner 54 scans either the control marks or a slice of the printed image extending in the longitudinal direction. The scanner 54 produces an output signal corresponding to the light reflected from the image passing by underneath the scanner. The scanner output signal is fed to the ECU 58. The ECU 58 compares information from the scanner and timing pulses from the encoder 50 with the reference image previously obtained from computer 60. Using this data, the ECU 58 computes the print-to-cut registration and directs the compensating device 150 to adjust accordingly.

The positional relationship of the respective ribbons 30, 32 with the cutting mechanism 38 is adjusted by controlling the movement of a respective compensation roller 150. A compensation motor 154 controls the position of the compensation roller 150. The compensation roller 150 and a pair of cooperating idler rollers 158 are interposed in the ribbon path upstream of the cutting mechanism 38. The compensation motor 154 is responsive to the control signal from the ECU 58 and selectively adjusts the position of the compensation roller 150 such that the effective length of the ribbon path between the printing units and the cutting mechanism 38 is increased or decreased as necessary. In this manner, the cutting mechanism 38 cuts the web 14 in a direction transverse to the direction of web movement at the appropriate time in order to separate the repeating images on the web 14 at the appropriate location.

Various other features and advantages of the invention are set forth in the following claims.

What is claimed is:

1. A method for determining a suitable lateral position of a scanner relative to an image printed with ink on a web for use with a cutoff control system, the scanner having a field of view and producing an output signal representative of the portion of the image within the field of view, said method comprising the steps of:

storing a reference array of digital prepress data in a format representative of the ink and the location of the ink in the printed image;

transforming the reference array into a transformed array in a format representative of the output signal of the scanner;

autocorrelating a segment of said transformed array to produce an autocorrelation array having at least one mathematical peak, said segment representative of a longitudinal portion of the image;

cross-correlating said segment of said transformed array with a plurality of neighboring segments of said transformed array, each of said neighboring segments representative of a longitudinal portion of the image, thereby producing a cross-correlation array having at least one mathematical peak;

determining any peaks in the cross-correlation array and autocorrelation array above a first predetermined threshold; and determining whether the cross-correlation array and the autocorrelation array each contain a single adjacent peak, and if so, determining the portion of the image corresponding to said peaks.

2. A method for determining a suitable lateral position of a scanner relative to an image repetitively printed with ink on a web traveling in a longitudinal direction, for use with a cutoff control system, the scanner having a field of view and producing an output signal representative of the portion of the image within the field of view, the method comprising:

storing a reference array of digital prepress data in a format representative of the ink and the location of the ink in the printed image;

transforming the reference array to a transformed array in a format representative of the output signal of the scanner;

computer analyzing the transformed array to determine whether the printed image includes an array of print which is suitable to be scanned to provide unambiguous cutoff control information;

providing separate control marks to the web if the printed image does not include a suitable array of print; and positioning the scanner at the location of the printed image corresponding to the suitable array of print if the printed image does include a suitable array of print.

3. The method as set forth in claim 2, wherein the step of computer analyzing the transformed array includes the step of autocorrelating a selected segment of the transformed array to produce an autocorrelation array, wherein the selected segment is representative of a longitudinal portion of the printed image.

4. The method as set forth in claim 3, wherein the step of computer analyzing the transformed array includes the step of determining any peaks in the autocorrelation array.

5. The method as set forth in claim 4, wherein the step of computer analyzing the transformed array includes the step of cross-correlating the selected segment with a plurality of neighboring segments of the transformed array to produce a cross-correlation array, wherein each of the neighboring segments is representative of a longitudinal portion of the printed image.

6. The method as set forth in claim 5, wherein the step of computer analyzing the transformed array includes the step of determining any peaks in the cross-correlation array.

7. The method as set forth in claim 2, wherein the digital prepress data is derived from a direct to plate system.

8. The method as set forth in claim 2, wherein the digital prepress data is derived from scanning a printing plate.

9. A method for controlling cutoff of a repetitively printed image printed on a continuous web traveling in a longitudinal direction using a scanner, the scanner producing an output signal, and for determining whether a suitable portion of the printed image exists for providing unambiguous cutoff information, the method comprising:

computer analyzing digital prepress data representative of the printed image by sequentially selecting segments of the digital prepress data corresponding to portions of the printed image extending in the longitudinal direction and individually autocorrelating each selected segment to produce corresponding autocorrelation arrays each having at least one mathematical peak;

for each autocorrelation array, determining if a single peak exists in the autocorrelation array above a predetermined threshold;

providing separate control marks to the web if there is no autocorrelation array having a single peak above the predetermined threshold;

selecting the most suitable segment if there is at least one autocorrelation array having a single peak above the predetermined threshold; and positioning the scanner at the area of the printed image corresponding to the most suitable segment.

10. The method as set forth in claim 9 wherein the step of computer analyzing the digital prepress data includes transforming the digital prepress data into a transformed array in a format compatible with the output signal of the scanner.

11. The method as set forth in claim 9 wherein the digital prepress data is derived from a direct to plate system.

12. The method as set forth in claim 9, wherein the digital prepress data is derived from scanning a printing plate.

13. A method for determining a suitable lateral position of a scanner relative to an image printed with ink on a web for use with a cutoff control system, the scanner having a field of view and producing an output signal representative of the portion of the printed image within the field of view, the method comprising the steps of:

storing a reference array of digital prepress data in a format representative of the ink and the location of the ink making up the printed image;

transforming a portion of the reference array into a transformed array in a format representative of the output signal of the scanner;

autocorrelating a segment of the transformed array to produce an autocorrelation array having at least one mathematical peak, the segment representative of a portion of the printed image;

cross-correlating the segment of the transformed array with a plurality of neighboring segments of the transformed array, each of the neighboring segments representative of a different portion of the printed image, thereby producing a cross-correlation array having at least one mathematical peak;

determining any peaks in the cross-correlation array and autocorrelation array above a first predetermined threshold;

determining whether the cross-correlation array and the autocorrelation array each contain a single adjacent peak, and if so, determining the portion of the printed image corresponding to the peaks; and positioning the scanner at the portion of the printed image corresponding to the peaks.

14. The method as set forth in claim 13, wherein if the cross-correlation array and the autocorrelation array do not each contain a single adjacent peak, selecting a second segment representative of a second portion of the printed image, repeating the steps of autocorrelating and cross-correlating using the second segment and determining any peaks in the resulting cross-correlation array and autocorrelation array above the first predetermined threshold.

15. The method as set forth in claim 14 further including the step of providing separate control marks to the printed image and positioning the scanner at those control marks if the resulting cross-correlation array and autocorrelation array do not each contain a single adjacent peak.

16. The method as set forth in claim 13 further including the steps of using a compensator to control the position of the web with respect to a cutting mechanism and pre-positioning the compensator before startup by using information derived from the reference array of digital prepress data.

17. The method as set forth in claim 16 further including the step of using a known phase difference between a scanner and the cutting mechanism to pre-position the compensator.

* * * * *